Figure 1:
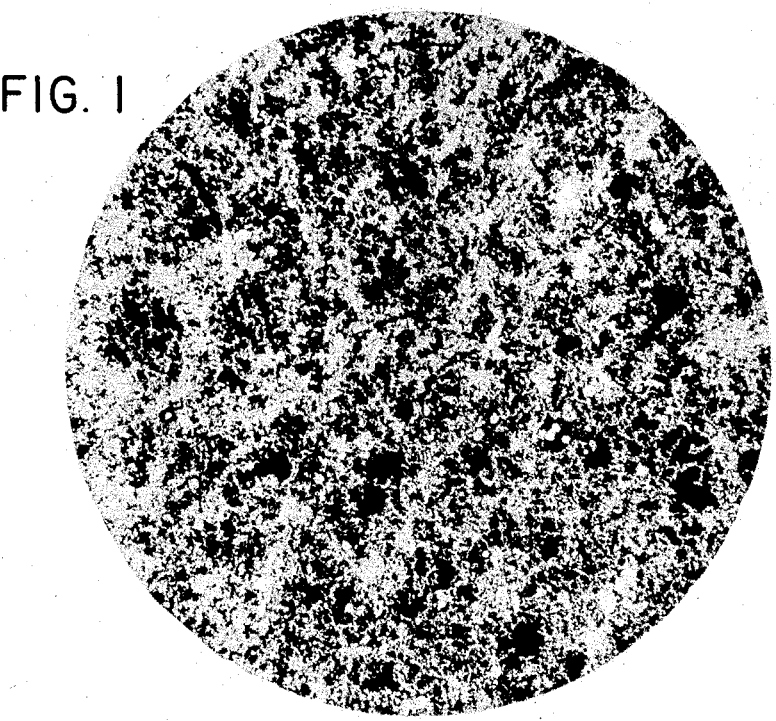

Nov. 10, 1959 — L. D. FETTEROLF — 2,912,342
PRODUCTION OF FINELY-DIVIDED SILICON DIOXIDE
Filed June 27, 1955

INVENTOR
LUTHER D. FETTEROLF
ATTORNEYS

United States Patent Office 2,912,342
Patented Nov. 10, 1959

2,912,342
PRODUCTION OF FINELY DIVIDED SILICON DIOXIDE

Luther D. Fetterolf, Palmerton, Pa., assignor to The New Jersey Zinc Company, New York, N.Y., a corporation of New Jersey Application June 27, 1955, Serial No. 518,245

2 Claims. (Cl. 106—288)

This invention relates to the production of finely divided silicon dioxide and, more particularly, to the production of silicon dioxide in a form which is particularly useful as a reinforcing agent for rubber.

Considerable attention has been given to the use of fine silica as a reinforcing agent for rubber. Silica compares favorably with the high bulking properties of carbon black because its specific gravity ranges from 2.0 to 2.4 whereas the specific gravity of carbon black ranges from 1.8 to 2.1. In this respect, silica is superior to the best white reinforcing agents previously developed for rubber, to wit, titanium dioxide and zinc oxide having specific gravities of about 3.9 and 5.6, respectively. Inasmuch as silica is superior to these other white pigments in the degree to which it approaches the desirable rubber-compounding properties of carbon black, fine silica is presently generally considered to be the most promising non-black reinforcing agent for rubber. Fine silica has, of course, many other uses including its use as a filler for plastics and as a thickening agent in paints and greases.

The interest in fine silica has resulted in the development of commercial scale operations for producing such a product. In general, these operations can be classified either as wet or dry processes. The wet processes contain an inherent disadvantage in the problem of removing water from the fine silica product, and this drying is made particularly difficult because of the pronounced tendency for the silica to hold adsorbed moisture. The dry process heretofore found to be most amenable to commercial scale operation has been that in which silicon tetrachloride is burned in air to form silicon dioxide. Although this latter process is effective and produces a very finely-divided silica, the silica thus produced has exhibited an annoying tendency to form accretions on surfaces and orifices in the combustion equipment. Some attempts have been made to vaporize sand and subsequently condense these vapors in the form of fine silica, but the exceedingly high temperature required for this purpose, and the resulting costly equipment problems, have discouraged commercial development of such a method.

I have now found that very finely-divided silica can be produced by burning silicon sulfide in air and that the resulting finely-divided silicon dioxide shows remarkably little tendency to form accretions in the combustion furnace. Accordingly, my novel method of producing finely-divided silicon dioxide comprises introducing silicon sulfide vapor into a hot combustion chamber, supplying the combustion chamber with combustion-supporting air, and recovering the resulting finely-divided solid particles of silicon dioxide. This silicon dioxide product, in addition to having a particle size ranging between about 0.01 and 0.1 micron, is generally characterized by a content of from about 0.1 to about 2% by weight of adsorbed sulfur-containing material expressed as S, although, as described further herein, the method may be varied or supplemented to yield a silica containing as high as about 5% by weight of sulfur in the form of this absorbed sulfur-containing material or a silica substantially free of the sulfur-containing material. This novel characteristic renders the product particularly useful as a reinforcing agent for rubber. In the presently preferred practice of the invention, the silicon sulfide, which is converted to silicon dioxide by the method of my invention, is produced by any one of a number of processes which yield silicon sulfide either in the solid or vapor state. In each instance, the fact that the silicon sulfide is sufficiently volatile to permit its separation from the reaction zone without significant contamination by other reaction products makes it possible, pursuant to the invention, to obtain a silicon dioxide product substantially free of undesirable contaminants. Whether the silicon sulfide vapors are removed directly from a high temperature reaction zone or are obtained by subsequently heating a reaction product containing solid silicon sulfide, the resulting silicon sulfide vapors are introduced directly into the combustion chamber where they are converted to finely-divided particles of silicon dioxide. The silicon dioxide can be readily separated from the gaseous combustion products by bag filters or by electrostatic precipitation. The gaseous effluent from this separation operation contains a considerable proportion of recoverable sulfur dioxide.

A wide variety of procedures are known for the production of silicon sulfide. The most economically attractive source of silicon for this purpose is silica sand, which is predominantly silicon dioxide. However, ferrosilicon as a source of silicon is advantageous because it makes possible the use of somewhat lower reaction temperatures in its conversion to silicon sulfide. The sources of sulfur for the reaction include elemental sulfur, pyrrhotite, pyrite, carbon disulfide, hydrogen sulfide and sulfur dioxide. For example, silica, advantageously in the form of sand, can be reacted at elevated temperatures with carbon and any of the aforementioned sources of sulfur with the resulting formation of silicon sulfide. Ferrosilicon can be reacted with pyrrhotite, pyrite or hydrogen sulfide with resulting direct production of silicon sulfide.

Of the aforementioned various methods of producing silicon sulfide, the most economically attractive procedures are those which involve the reaction of sand, carbon and either pyrrhotite or sulfur. The first of these procedures, involving the reaction between sand, carbon and pyrrhotite, requires the use of a reaction temperature of about 1400° to 1600° C. The reaction proceeds satisfactorily at temperatures within the range of 1400° to 1500° C. When an inert sweeping gas such as nitrogen is used to remove the silicon sulfide from the reaction zone (and thus promote completion of the reaction), but good results have been obtained without such a sweeping gas when reaction temperatures closer to 1600° C. have been used. The silicon sulfide produced by this reaction, when subsequently burned to form silicon dioxide pursuant to my invention, yields a finely-divided silica product containing some carbon dust and some specks of iron compounds. A typical chemical analysis of silicon dioxide produced in this manner comprises 87.1% $SiO_2$, 1.6% S, 0.7% Fe, 0.2% C and approximately 9% adsorbed water. When sulfur is substituted for pyrrhotite in the aforementioned procedure, the color of the silica product is improved inasmuch as it is substantially free from iron compounds. The contact between sulfur vapor and the raw silica (sand) is so intimate and effective that a somewhat lower reaction temperature is required for producing the silicon sulfide. However, it must be understood that the practice of my invention is not limited or restricted to any specific source of, or method of producing, the silicon sulfide which is subsequently converted to silicon pursuant to the invention.

Careful investigation of all known methods of producing silicon sulfide, represented by the procedures described hereinbefore, has indicated that the sulfide product is generally a mixture of sulfides including silicon monosulfide (SiS), silicon disulfide (SiS₂) and silicon oxysulfide (SiOS). All of these forms of silicon sulfide are capable of being volatilized and are converted to finely-divided silicon dioxide by the method of my invention. Therefore, as used herein and in the claims, the expression "silicon sulfide" shall be understood to include silicon monosulfide, silicon disulfide and silicon oxysulfide, and mixtures of these sulfides.

The silicon sulfide which is burned in air pursuant to my invention is introduced into the combustion chamber in the vapor state. When the silicon sulfide has been formed in a distant operation and is immediately available only in the solid state, it is heated in any suitable vaporizing furnace or compartment capable of transforming the solid material to the vapor form. On the other hand, when the silicon sulfide is produced in an operation which is integrated with the subsequent conversion of the sulfide to the oxide, I have found it advantageous to closely position the sulfide-producing reaction zone and the combustion zone so that the silicon sulfide vapors can be transferred directly from the reaction zone to the combustion zone without excessive loss of heat.

Combustion of the silicon sulfide vapor in the method of my invention takes place readily in a hot combustion zone supplied with air. At the initiation of the combustion, I have found it desirable to heat the combustion zone to a minimum temperature of about 900° C., and preferably to a temperature of about 1000°–1100° C., in order to maintain the silicon sulfide in the vapor state. The combustion of the silicon sulfide vapor in the oxygen-containing atmosphere of the combustion zone evolves a considerable amount of heat so that in relatively large scale operation the heat of combustion is sufficient to maintain the desired combustion of the silicon sulfide to silicon dioxide in the combustion zone. Although the use of excess combustion air presently appears to have little effect upon the particle size of the silica product as observed in an electron microscope, the use of excess air does increase the surface area of the particles as measured by conventional nitrogen adsorption procedure.

The particles of silicon dioxide formed in the course of the combustion of the silicon sulfide vapor are very fine. The maximum degree of fineness appears to be achieved by the use of a considerable excess of air blown into the burning silicon sulfide vapor so as to chill the products of combustion as quickly as possible, but this use of an excess of air is not essential. The silicon dioxide particles produced by the method of my invention range in size from about 0.01 to 0.1 micron, and representative samples have been ascertained by the nitrogen adsorption procedure to have surface area measurements of 50 to 120 square meters per gram.

Figure 2:
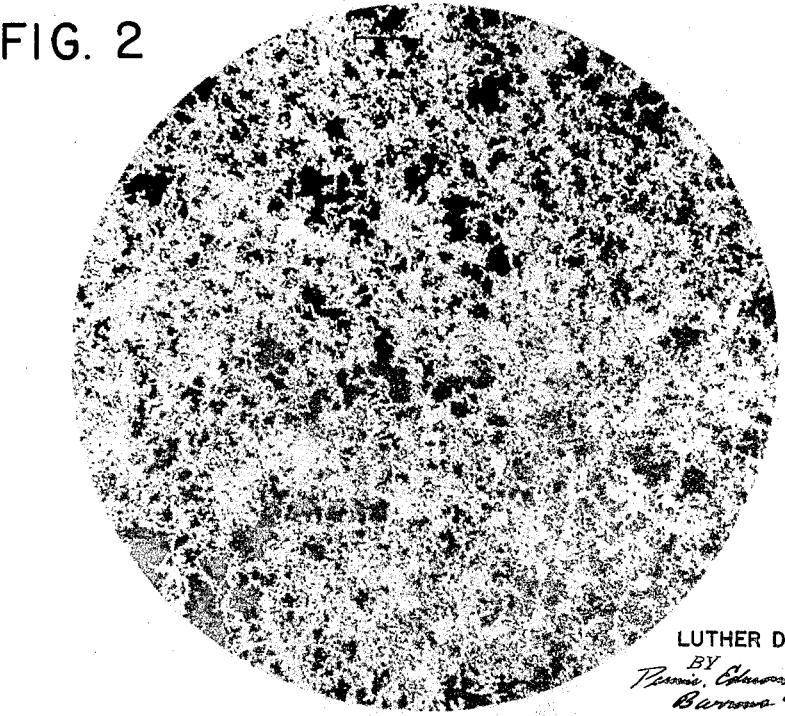

These finely-divided silicon dioxide particles can be readily separated from the combustion gases in an electrostatic precipitator. Although the particles are finer than the pores in the type of cloth used as bag collectors for zinc oxide, the particles flocculate into chains and therefore are readily retained in conventional bag filters. This flocculation is clearly shown in the accompanying drawing in which Fig. 1 is an electron micrograph at 16,000 magnification of a silicon dioxide product obtained by the method of my invention; and Fig. 2 is a similar electron micrograph of another representative specimen of my novel product.

The silicon dioxide product obtained by burning silicon sulfide pursuant to my invention, in addition to being of appropriate size for compounding with rubber, has the further advantage of containing a small but significant amount of one or more sulfur-containing materials. The nature of these compounds varies somewhat with the nature of the procedure by which the silicon sulfide has been prepared, but in general they include silicon sulfide, sulfur dioxide, sulfur trioxide, carbon disulfide, iron sulfide and even elemental sulfur itself. Regardless of their identity in a specific silicon dioxide product produced pursuant to the invention, they are generally present in amount, calculated as sulfur (S), ranging from about 0.1% to about 2%, and even as high as about 5%, by weight of the silicon dioxide product. The presence of this small but significant amount of sulfur has the effect of imparting to the rubber with which this silicon dioxide product has been compounded a significantly greater resilience and resistance to aging than conventional silicon dioxide products. This improvement is readily apparent from the data reported later herein in the form of Tables I and II. Although the sulfur-containing material is advantageously introduced into the silica by virtue of the nature of my novel method of producing the silica, similar improvement can be obtained by introducing these sulfur-containing materials from an extraneous source into conventionally-produced finely-divided silica. Whether such extraneously obtained sulfur-containing materials are used as the sole or supplemental source thereof in my novel silica product, the sulfur-containing materials will include not only those previously mentioned but also various organic sulfur-containing materials. I have found, however, that the sulfur compound can be largely removed by reheating the silicon dioxide product so as to volatilize and drive off the sulfur compounds or by washing the product with water or with any other solvent for the sulfur-containing material. Thus, the silicon dioxide product may be obtained either substantially free of sulfur-containing material, or, if this product is to be used for the compounding of rubber, it may advantageously be used in the as-produced form.

The practice of the method of my invention and the utility of the product obtained by this method are illustrated by the following specific example. A dry intimate mixture of 57.3 parts of pyrrhotite, 24.5 parts of sand and 18.2 parts of coal was moistened with 5.0 parts of waste sulfite liquor as a binder, all parts herein referred to being by weight. The moistened mixture was then pelleted by conventional procedure to form a reaction mixture containing an approximately 50% excess each of sulfur and of carbon beyond the amounts theoretically required to satisfy the assumed reaction:

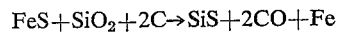

$$FeS + SiO_2 + 2C \rightarrow SiS + 2CO + Fe$$

Pellets of this mixture were charged at intervals of 15 minutes into a reaction furnace maintained at a reaction temperature of about 1450°–1475° C. by means of a spiral graphite electric resistor. In order to provide positive control over the flow of the evolved silicon sulfide vapor, pure dry nitrogen was swept through the reaction furnace to carry with it the reaction products silicon sulfide and carbon monoxide. This reaction effluent was introduced directly into a combustion furnace maintained at a temperature of about 1050° C. by a wire-wound electric resistor. Air was introduced into the combustion furnace at a rate 4.6 times that theoretically required to supply the oxygen necessary to combine with both the silicon sulfide content and the carbon monoxide content of the reaction effluent charged to the furnace. The products of combustion comprised finely-divided particles of silicon dioxide suspended in a mixture of sulfur dioxide, carbon dioxide, nitrogen and unconsumed air. These products of combustion were passed into a bag filter where the solid particles of silicon dioxide were entrained and collected.

A number of runs under the foregoing conditions were completed and collectively yielded a finely-divided silicon dioxide product the particles of which ranged in size from 0.01 to 0.1 micron and which had the following ranges of constituents as determined by chemical analysis: SiO₂, 87–89%; total S, 1.5–1.6%; Fe, 0.25–1.0%; C, 0.1–0.3%; and water (evolved at 110° C.), 1.6–1.9%. The electron micrograph shown in Fig. 1 of the accompanying drawing shows a representative sample of this product at a magnification of 16,000. In this electron micrograph, in which the silicon dioxide particles are white and the background is black, the flocculation of the silicon dioxide particles in the form of "chains" is clearly apparent.

The effectiveness of the silicon dioxide product obtained by the foregoing procedure as a reinforcing agent for natural rubber is shown by the following table. The tests reported in this table were carried out under standard conditions utilized by the rubber industry and were conducted by using three separate samples of the silicon dioxide pigment, one being the pigment produced as just described and shown in Fig. 1, another being a commercially available product produced by a wet process, and the third being a commercially available product obtained by the burning of silicon tetrachloride:

TABLE I

Normal test on $SiO_2$-containing natural rubber

| Source of $SiO_2$ | Max. Tensile, Pounds | Max. Elgonation, percent | Max. Tear, Pounds | Rebound, percent |
|---|---|---|---|---|
| From SiS | 4,320 | 705 | 834 | 70 |
| Wet Process | 4,120 | 690 | 853 | 46 |
| From $SiCl_4$ | 3,145 | 675 | 655 | 48 |

The test data reported in Table I was obtained by using curing periods which, in each instance, produced maximum tensile strength, elongation and tear strength. These data show the rebound (resilience) superiority of the rubber product containing the silicon dioxide of the invention over the rubber products containing finely-divided silicas obtained by different procedures.

The aging superiority of rubber compounded with the silicon dioxide obtained by the method of my invention over products similarly compounded with other commercially available finely-divided silica is shown in Table II. The data reported in Table II compare the maximum tensile strength and elongation obtainable after aging the compounded rubber for 24 hours at 100° C., this being a test accredited in the rubber industry as demonstrating, by acceleration, the qualities and characteristics which develop during long-term natural aging of the rubber. In each instance, the results are reported for the product whose initial curing time gave maximum results at the end of the aging period:

TABLE II

Test after aging 24 hrs. at 100° C.

| Source of $SiO_2$ | Max. Tensile, Pounds | Max. Elongation, percent | Percent Retention | |
|---|---|---|---|---|
| | | | Tensile | Elong. |
| From SiS | 3,020 | 635 | 70 | 91 |
| Wet Process | 2,550 | 395 | 54 | 47 |
| From $SiCl_4$ | 2,310 | 385 | 76 | 53 |

The data reported in Table II show clearly the superiority of the silicon dioxide product of my invention in producing optimum aging qualities in the rubber in which the product is compounded.

The fact that the properties and utility of the silicon dioxide product obtained as a method of my invention is not dependent upon the source of the silicon sulfide is illustrated by the following example. A dry intimate mixture of 79.3 parts of pyrrhotite and 20.7 parts of 90% grade ferrosilicon was moistened with 1.0 part by weight of waste sulfite liquor as a binder, and the moistened mixture was then pelleted. The sulfur content of this mixture was just that theoretically required to satisfy the assumed reaction:

FeS+Si (ferrosilicon)→SiS+Fe

The pelleted mixture was charged at 10 minute intervals into a reaction furnace electrically heated and maintained at a temperature of about 1150° C. Pure dry nitrogen was swept through the reaction furnace so as to carry the evolved silicon sulfide vapor to an adjacent combustion furnace electrically heated to and maintained at a temperature of about 1050° C. The combustion furnace was provided with an amount of air 5 times as much as that theoretically required to supply the oxygen required to combine with the silicon sulfide content of the gaseous charge to the combustion furnace. The silicon dioxide product, collected in a bag filter, analyzed 89.9% $SiO_2$ and 1.5% total sulfur. Its surface area measurement was ascertained by nitrogen adsorption test to be 150 square meters per gram. When mixed with natural rubber and tested as described hereinbefore, substantially the same superior end results were obtained as have previously been reported in Tables I and II. The electron micrograph shown in Fig. 2, taken at a magnification of 16,000, shows the size and flocculating characteristics of this silicon dioxide product.

It will be appreciated that the product of this invention, while it has particularly desirable characteristics as a reinforcing agent for rubber, is also useful for all other purposes where a finely-divided stable pigment is required. The method of producing this product is not only commercially attractive because of the relatively low cost of its starting material (silicon sulfide) but because the conversion of the sulfide to the dioxide is not accompanied by excessive accretion formation or by the liberation of highly corrosive chlorine (or chlorides) and is moreover capable of being carried out at commercially acceptable operating temperatures.

I claim:

1. The method of producing finely-divided silicon dioxide which comprises reacting silica sand with carbon and a sulfur-containing material at a temperature sufficiently high to produce a gaseous mixture of silicon sulfide vapor and carbon monoxide, introducing the gaseous mixture into a combustion zone at a temperature sufficiently high to maintain the silicon sulfide in the vapor state in the presence of the carbon monoxide, supplying the combustion zone with air in amount at least sufficient to support combustion of the gaseous mixture of the silicon sulfide vapor and the carbon monoxide, rapidly cooling the resulting products of combustion, and collecting the resulting finely-divided particles of silicon dioxide.

2. The method of producing finely-divided silicon dioxide which comprises reacting silica sand with carbon and a sulfur-containing material at a temperature sufficiently high to produce a gaseous mixture of silicon sulfide vapor and carbon monoxide, introducing the gaseous mixture into a combustion zone at a temperature sufficiently high to maintain the silicon sulfide in the vapor state in the presence of the carbon monoxide, supplying the combustion zone with a manifold excess of air to support combustion of the gaseous mixture of the silicon sulfide vapor and the carbon monoxide and to rapidly cool the products of combustion, and collecting the resulting finely-divided particles of silicon dioxide.

References Cited in the file of this patent

UNITED STATES PATENTS

| 61,931 | Fleury | Dec. 28, 1866 |
| 1,426,602 | Robertson | Aug. 22, 1922 |
| 1,850,286 | Mittasch et al. | Mar. 22, 1932 |
| 2,578,605 | Sears et al. | Dec. 11, 1951 |
| 2,635,946 | Weber et al. | Apr. 21, 1953 |

FOREIGN PATENTS

| 258,313 | Great Britain | Sept. 15, 1926 |

OTHER REFERENCES

Mellor: "Comprehensive Treatise on Inorganic and Theoretical Chemistry," vol. 6, 1925, pp. 986 and 987.